A. L. MILENTZ.
GLASS CUTTING MACHINE.
APPLICATION FILED OCT. 29, 1908.
933,481.
Patented Sept. 7, 1909.
5 SHEETS—SHEET 1.
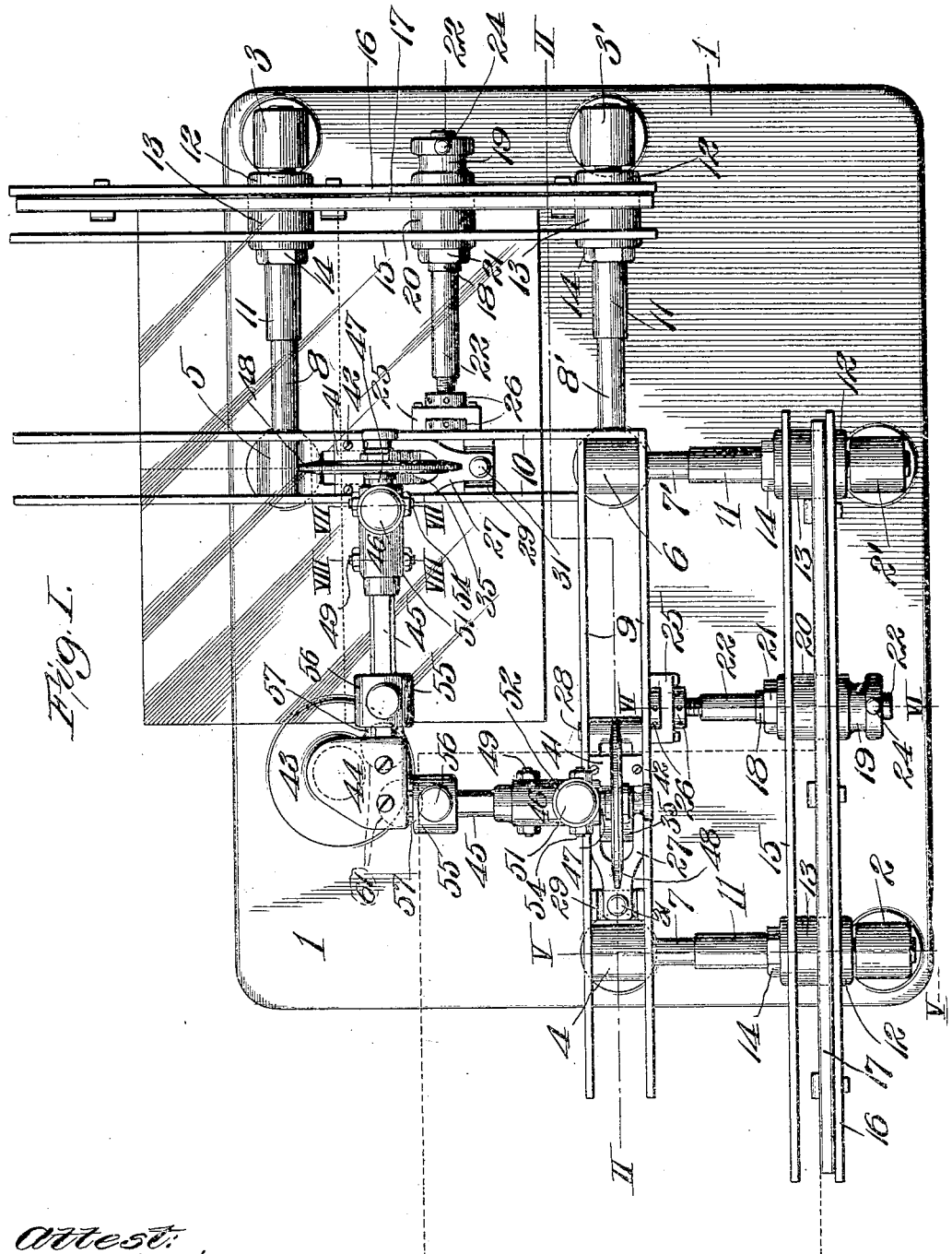
Fig. I.
Attest:
Wm. H. Scott
Blanche Hogan
Inventor:
A. L. Milentz
by Geo. H. Wright atty.

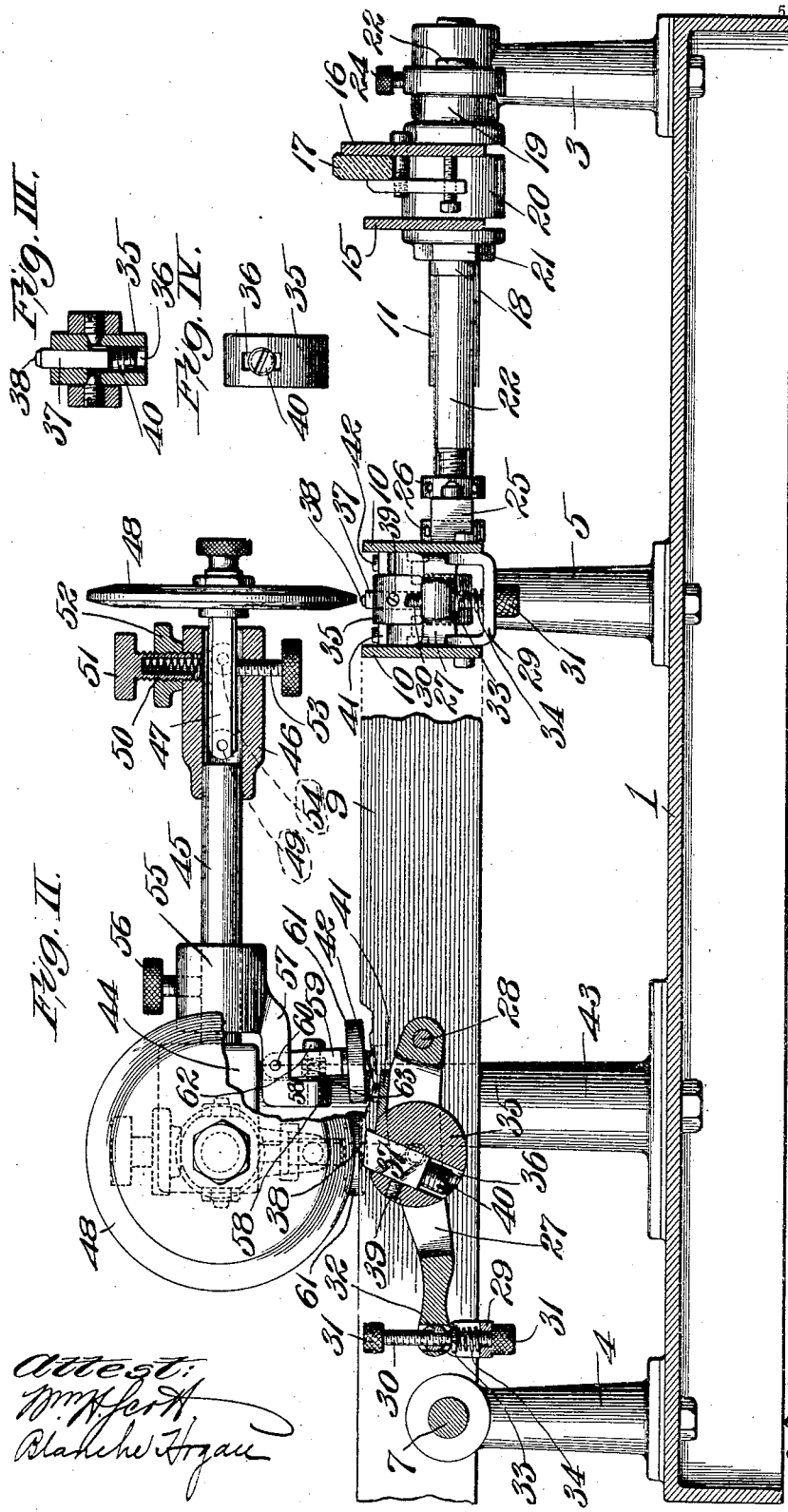

A. L. MILENTZ.
GLASS CUTTING MACHINE.
APPLICATION FILED OCT. 29, 1908.
933,481.
Patented Sept. 7, 1909.
5 SHEETS—SHEET 3.
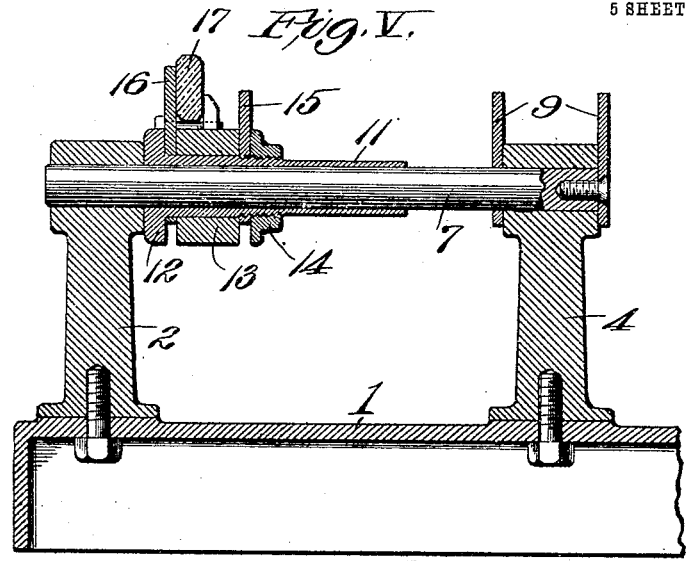
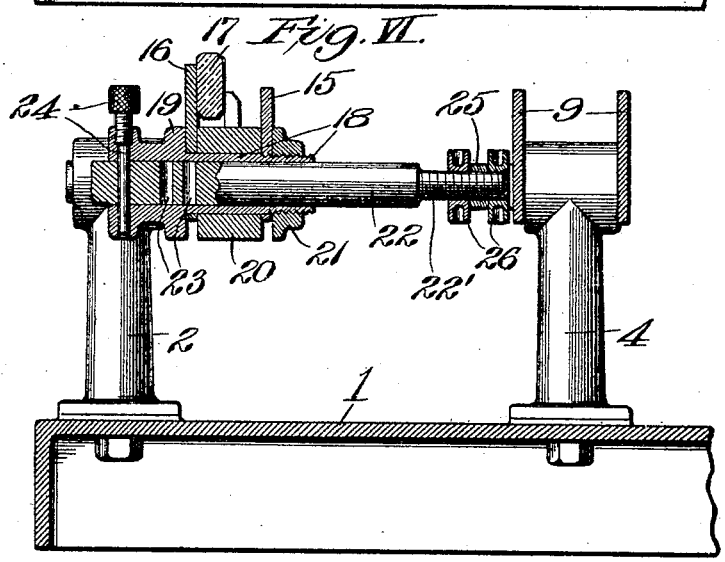
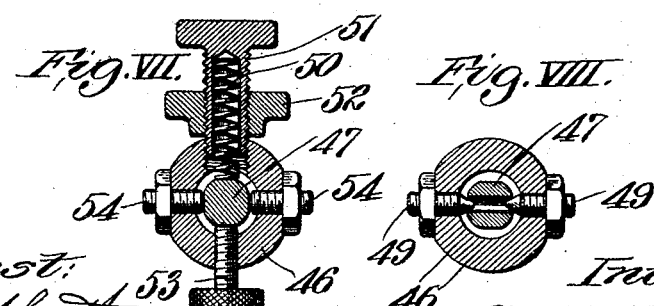

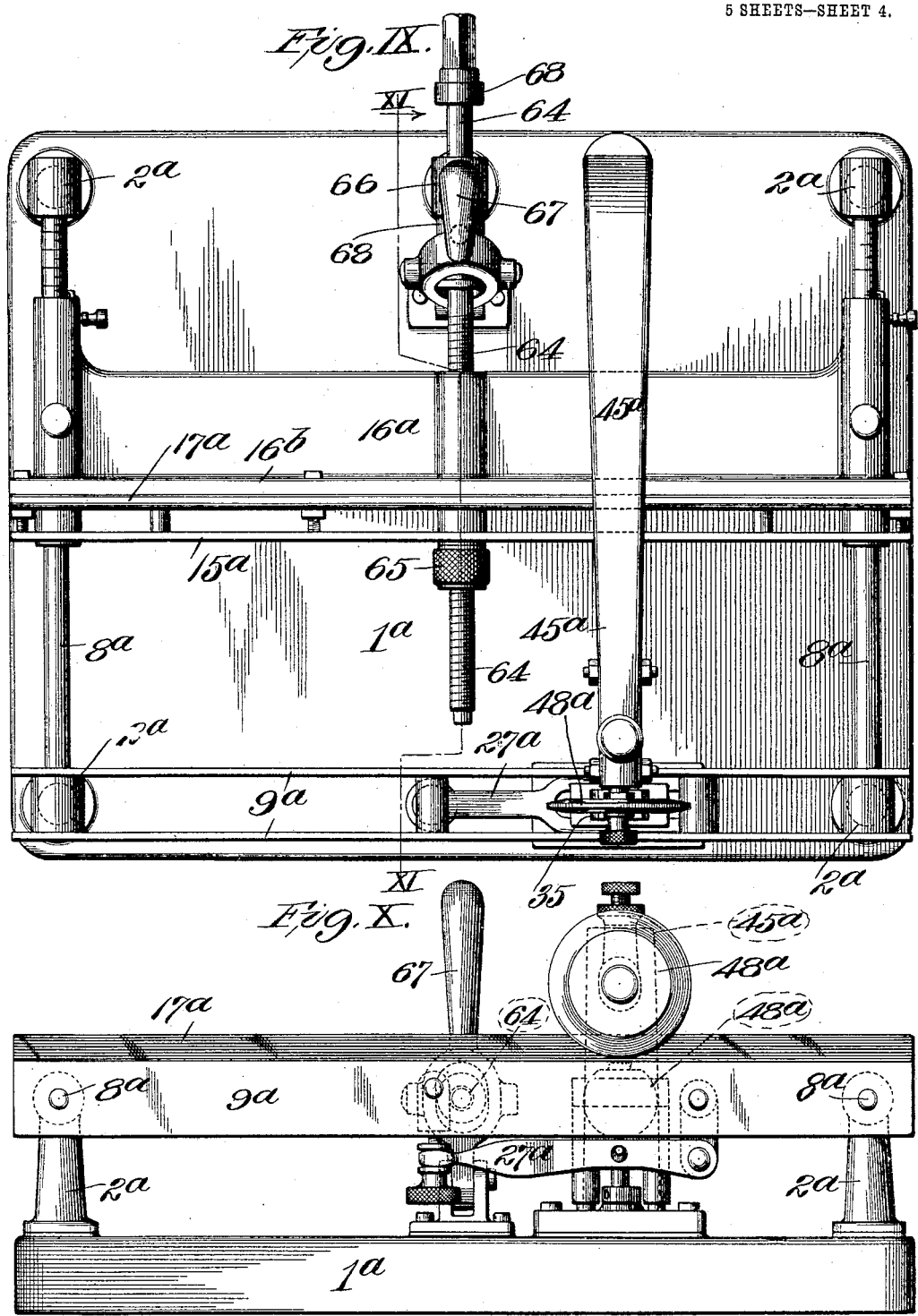

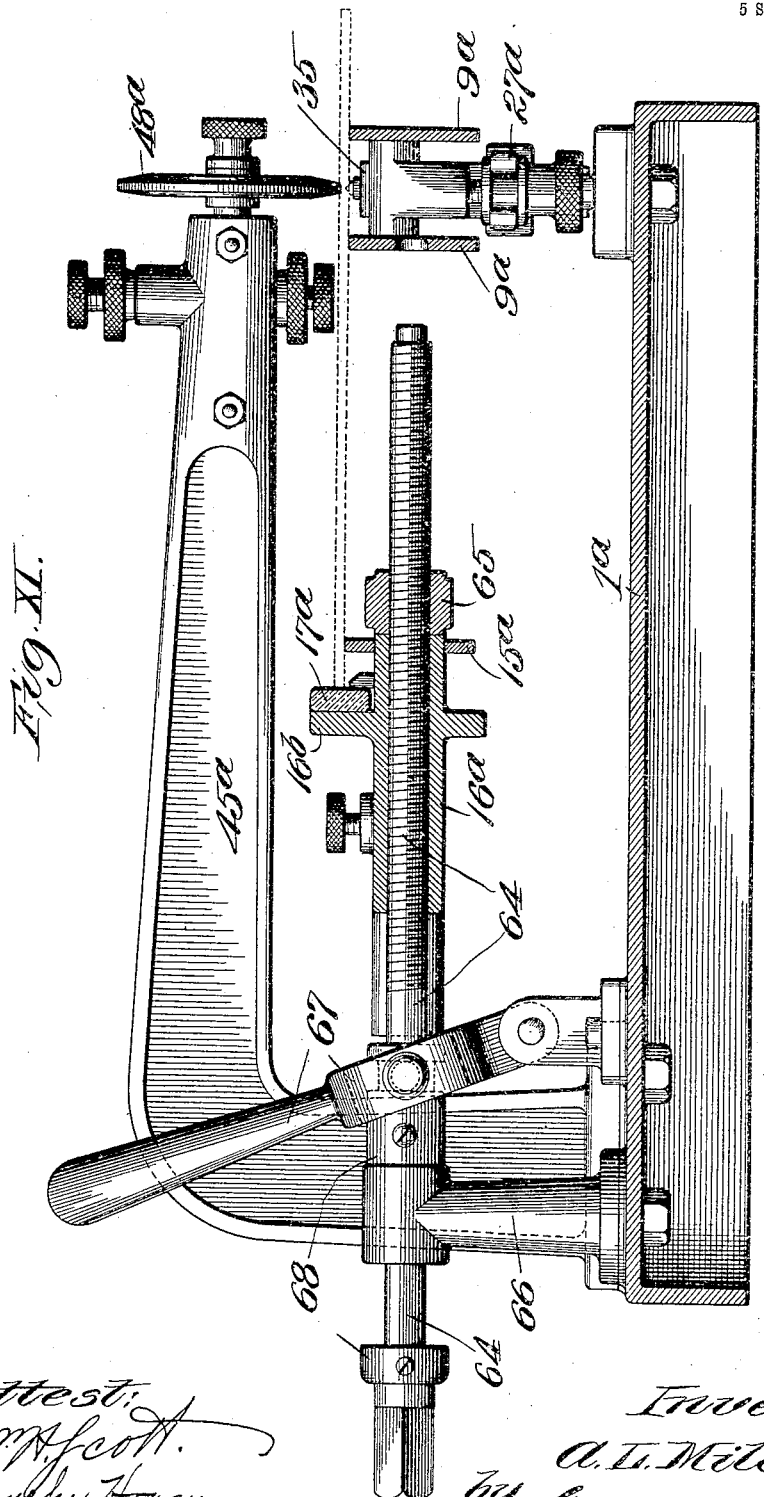

UNITED STATES PATENT OFFICE.

ARNOLD L. MILENTZ, OF ST. LOUIS, MISSOURI.

GLASS-CUTTING MACHINE.

933,481.

Specification of Letters Patent. Patented Sept. 7, 1909.

Application filed October 29, 1908. Serial No. 459,969.

*To all whom it may concern:*

Be it known that I, ARNOLD L. MILENTZ, a citizen of the United States of America, residing at the city of St. Louis, in the State of Missouri, have invented certain new and useful Improvements in Glass-Cutting Machines, of which the following is a full, clear, and exact description, reference being had to the accompanying drawings, forming part of this specification.

My invention relates to a machine for cutting sheets of glass into various sized plates, the machine being more particularly intended for use in cutting sheets of glass into plates to be used as photographic dry plates which are made in various sizes. To provide for the cutting of a variety of sizes of plates the parts of the machine are made adjustable and to facilitate the glass sheet cutting operations, parts of the machine are preferably arranged at angles to each other in order that the glass plate may first be scored in one direction by a cutter and then scored in a direction transverse to the first direction without the sheet being removed from the machine.

Figure I is a top or plan view of my glass cutting machine. Fig. II is an enlarged vertical section taken on irregular line II—II, Fig. I, and also through the support for one of the pressure wheels. Fig. III is a vertical cross section taken through one of the cutter holders and its support. Fig. IV is an inverted plan view of one of the cutter holders. Fig. V is an enlarged vertical cross section taken on line V—V, Fig. I. Fig. VI is an enlarged vertical cross section taken on line VI—VI, Fig. I. Fig. VII is an enlarged vertical cross section taken on line VII—VII, Fig. I. Fig. VIII is an enlarged vertical cross section taken on line VIII—VIII, Fig. I. Fig. IX is a top or plan view of a modified form of my machine. Fig. X is a side elevation of the machine shown in Fig. IX. Fig. XI is a vertical cross section taken on line XI—XI, Fig. IX.

In the accompanying drawings, and referring first to Figs. I to VIII inclusive, in which I have shown my machine utilizable for cross cutting of sheets of glass: 1 designates the base of the machine which is mounted at one side by a pair of outer posts 2 and 2′ and at another side at right angles to the first mentioned side is surmounted by a pair of outer posts 3 and 3′. The posts 2 and 3 are located at corners of the base diagonally opposite each other, while the posts 2′ and 3′ are located intermediate of the corners of the base at the sides thereof which they surround. 4 is a post located opposite the post 2. 5 is a post located opposite the post 3 and 6 is an intermediate post located near the center of the base and located opposite to both of the posts 2′ and 3′. The posts 2 and 4 have mounted therein above the base a supporting rod 7 and the posts 2′ and 6 have mounted therein a supporting rod 7′ that is parallel with the rod 7. The posts 3 and 5, and 3′ and 6 have mounted in them supporting rods 8 and 8′ arranged parallel with each other and at a right angle to the supporting rods 7 and 7′.

9 designates supporting rails fixed to the posts 4 and 6 and extending from the end of the base 1 at which the post 4 is located to a point intermediate of ends of the base at which the post 6 is located, and 10 are supporting rails fixed to the posts 6 and 5 and extending transversely relative to the rails 9, or at a right angle relative to said rails. The rails 9 and 10 provide for the partial support of the sheets of glass to be cut in my machine when said sheets are moved first in one general course and then in the general course at a right angle to the first course. In order that the sheets of glass to be cut may be fully supported while passing through the machine I provide, in conjunction with each pair of supporting rails 9 and 10, adjustable supporting and guiding members that are adapted to be so manipulated as to permit of the sheets of glass being cut into different sized plates or sections according to the adjustment of the parts just mentioned. These parts are supported by the supporting rods 7, 7′ and 8, 8′, there being two sets of the parts, one of which is companionable with, and is movable relative to the supporting rails 9 while the other set is companionable with and movable relative to the supporting rails 10. The adjustable supporting and guiding parts companionable with the supporting rails 9 and 10 are similar in construction and it will only be necessary to describe specifically one set of the parts with the understanding that the description applies equally to the other set.

11 designates sleeves loosely mounted upon either pair of supporting rods of the machine and shiftable thereon relative to the supporting rails that extend transversely to said supporting rods. Each of these sleeves, see Fig. V, is provided at its outer end with an annular flange 12 and has fitted to it a distance ring or piece 13 between which and a nut 14 is located a supporting rail 15 upon which the sheet of glass to be cut may rest in conjunction with its resting upon the supporting rails 9 and 10 that are parallel with the rail 15.

16 is a gage bar fitted to the sleeves 11 and resting against their flanges 12, the bar being held in a fixed position upon the sleeves between said flanges and the distance piece 13, due to the clamping action exerted by the nuts 14. The gage bar 16 preferably has secured to it at its inner face a wear strip 17 preferably of glass and against which the sheet of glass that is being conducted through the machine travels to be directed in a straight course while passing over the cutter to be hereinafter more particularly mentioned. It may be here stated that the cutter is located in juxtaposition to either the supporting rails 9 or 10 and in setting the parts of the machine to cut different sized plates from a sheet of glass, it is necessary to adjust the gage bar 16 inwardly and outwardly relative to the supporting rails 9 or 10 and the cutter associated therewith. This adjustment is secured by the following members, seen most clearly in Fig. VI. 18 is a sleeve extending through the supporting rail 15 and the gage bar 16 midway between the sleeves 11 and which is provided at its outer end with a head 19. The sleeve 18 has mounted upon it between said supporting rail and gage bar a distance piece 20 and has fitted to it a nut 21 by which the supporting rail and gage bar are held in fixed positions upon the sleeve. 22 is an adjusting rod to which the sleeve 18 is loosely fitted, and which is provided with a plurality of pin holes 23 extending transversely of the rod and either of which is adapted to receive a set pin or key 24 which is adapted to be seated in the head of the sleeve 18. The adjusting rod 22 is provided at its inner end with a screw threaded stem 22' that is loosely mounted in a bracket 25, see Figs. I and VI, attached to the supporting rail 9 or 10 that faces said adjusting rod. At opposite sides of the bracket 25 and fitted to the screw threaded stem of the adjusting rod are adjusting nuts 26 by which the adjusting rod may be shifted longitudinally for accurate adjustment of the gage bar 16 relative to the supporting rails 9 or 10 and the simultaneous adjustment of the parts associated with said gage bar. In the use of the machine, quick adjustment of the gage bar 16 relative to the supporting rails 9 or 10 to provide for the cutting of different sized plates of glass is obtained by removing the set pin 24 which permits of the sleeve 18 being shifted upon the adjusting rod 22 in order that said set pin may be introduced into another pin hole 23 in the adjusting rod and thereafter accurate adjustment of the gage bar is secured by manipulation of the adjusting nuts 26.

The cutters of my machine and their supports which are associated with the supporting rails 9 and 10 are similar in construction and therefore a description of one of the cutters and its support will suffice.

27 is an arm located between either pair of supporting rails 9 or 10 and pivotally connected thereto at 28. This arm is slotted longitudinally and its end farthest removed from its point of pivotal attachment to the supporting rails is spring supported by the following means. 29 is a bracket arm fixed to one of the supporting rails and provided with an aperture located beneath the arm 27. 30 is an adjusting screw having heads 31 located at its upper and lower ends and having screw threaded engagement with a nut 32 that is pivotally mounted in the arm 27, thereby providing for the vertical movement of said arm through the medium of the adjusting screw by the manipulation of either of its heads. The arm 27 rests upon a spring seat washer 33 that surmounts a lift spring 34 interposed between said washer and the bracket arm 29. This lift spring serves to yieldingly support the arm 27 in order that it may move downwardly when pressure is exerted upon it and the upward movement of the arm under the influence of the lift spring is controlled by the head 31 at the lower end of the adjusting screw.

35 is a cutter bar holder rotatably mounted in the slot in the arm 27. This cutter bar holder is provided with a way 36 in which is a cutter bar 37 that is provided with a diamond point 38 or other suitable cutter that is adapted, in the use of the machine, to project slightly above the surface of the supporting rails 9 or 10. The cutter bar is held in a fixed position in the holder 35 by a set screw 39 and it may be shifted in the way 36 in said holder by an adjusting screw 40 for the purpose of causing the cutter end of the bar to protrude beyond the holder to the desired extent. The holder 35 is preferably cylindrical in shape except at the point at which the cutter bar projects therefrom and it is adapted to be rotated upon its axis to position the cutter at the desired angle relative to the sheet of glass that is being cut while moved upon the supporting rails of the machine in order that the best cutting action may be secured.

41 is a retaining plate mounted upon the frame 27 adjacent to the cutter bar holder. This retaining plate is secured to the frame by set screws 42 and it is adapted to be held in engagement with the cutter bar holder, as seen in Fig. II, for the purpose of retaining the holder in a fixed position after it has been adjusted.

43 designates a standard surmounting the base of the machine and provided at its upper end with a head 44.

45 are arms secured to the head of the standard 43 and extending therefrom at right angles to each other and in directions toward the supporting rails 9 and 10. These arms serve as supports for devices of similar construction and a description of the devices on one arm will apply equally to the devices on the other arm.

46 is a hollow extension attached to either of the arms 45 and extending into a position above either the supporting rails 9 or 10.

47 is a spindle located in the extension 46 and extending longitudinally thereof, the outer end of the spindle being located exterior of said extension and above one of the cutters of the machine. Upon this spindle is rotatably mounted a pressure wheel 48 that is adapted to bear against a sheet of glass when it is being conducted through the machine in order that the cutter beneath the wheel may perform its office of cutting or scoring the glass at its lower side. The spindle 47 is pivotally supported at its rear end by pivot screws 49 mounted in the extension 46 and having conical inner ends that are seated in the sides of the spindle, as seen in Fig. VIII. In order that the spindle may be so held as to press yieldably upon the sheet of glass beneath it, I provide a pressure spring 50 that rests upon the spindle, see Figs. II and VII, and which may be varied in tension by an adjusting screw 51 in which it is partially housed and which is mounted in the extension 46 above the spindle. The adjusting screw 51 has fitted to it a jam nut 52 by which the screw may be retained in a fixed position after it has been adjusted.

53 is a lower limitation screw mounted in the extension 46 beneath the spindle 47 and serves to restrict the downward movement of said spindle.

54 are side limitation screws mounted in the extension 46 and serving to restrict the lateral movement of the spindle 47.

55 designates a collar slidably mounted upon either of the arms 45 and adapted to be held in a fixed position upon the arm by a set screw 56. The collar 55 is provided with a hanger arm 57 that has a leg 58.

59 is a journal arm having its upper end pivoted at 60 to the hanger arm 57 and to the lower end of which is journaled a guide wheel 61. This journal arm is loosely connected to the leg 58 of the hanger arm 57 by a retaining screw 62 and it is backed by a spring 63, see dotted lines Fig. II, that serve to normally press the journal arm and the guide wheel supported thereby toward the opposing gage bar 16 of the machine. When a sheet of glass is being conducted through the machine it travels between one of the gage bars and its wear strip and one of the guide wheels 61 that opposes said gage bar, and during this travel of the sheet of glass it is yieldably held against the wear strip of the gage bar, due to the pressure exerted thereagainst by the spring controlled guide wheel.

In the practical use of my machine, the sheets of glass to be cut are first laid upon either the supporting rails 9 or 10 and the supporting rail 15 that is opposite the other supporting rails, and one edge of the sheet of glass is placed in contact with the wear piece of the gage bar 16 adjacent to the supporting rail 15 while the other edge bears against the guide wheel 61 that opposes said gage bar. The sheet of glass is then moved forwardly so that it passes beneath the pressure wheel 48 above it and over the cutter beneath said wheel with the result of causing said sheet of glass to be cut at its lower side by the yieldably supported cutter. The movement of the sheet of glass is continued until the sheet has been cut or scored from one end or side to the opposite end or side thereof, while it is traversing the particular cutter just mentioned. The sheet of glass is then moved transversely of the machine upon the other set of supporting rails upon which its position is gaged in a manner similar to the gaging in its first course of movement and the sheet of glass, by passing over the second cutter and beneath the second pressure roller, is cut or scored in a direction transversely of the first cutting or scoring. The sheet of glass, being then taken from the machine, may be readily severed into the desired plates or sections. In Fig. I, I have illustrated in dotted lines a sheet of glass represented as resting upon the supporting rail 15 companionable with these rails, the sheet of glass in this position being for instance, that occupied by it in the first or initial cutting operation and I have shown in full lines the sheet of glass resting upon the supporting rails 10 and the supporting rail 15 companionable therewith, the sheet in this position being here shown as it appears after the initial cutting or scoring in one direction has taken place and it is being cut or scored in the transverse direction.

In Figs. IX to XI inclusive, I have shown a modification of my glass cutting machine intended for use in cutting sheets of glass in only one direction. In this modification the sheets from which the plates of glass are to be cut are moved in one general course only instead of being moved first in one course and then in a course transversely to the first course as provided for in my machine previously described. 1ª designates the base of the modified machine which is surmounted by corner posts 2ª in which are mounted guide rods 8ª arranged parallel with each other. 9ª are main supporting rails that, in addition to their service as supports for the sheets of glass, serve to support the arm 27ª in which the cutter bar holder 35 is mounted. 48ª is the pressure roller located above the cutter bar holder and supported by the arm 45ª projecting upwardly from the base 1ª. 16ª designates a cross head slidably mounted upon the guide rods 8ª and provided with a gage bar 16ᵇ that opposes the supporting rails 9ª and is provided with a wear strip 17ª. 15ª is a supporting rail carried by the cross head just mentioned and upon which the sheets of glass to be cut rest while resting also upon the rails 9ª. The cross head 16ª is adjustable upon the guide rods by which it is supported for the purpose of moving the gage bar 16ᵇ relative to the cutter of the machine to determine the width or length of the plate of glass to be cut and the adjustment of said cross head is accomplished by the following parts: 64 is a shift rod that passes centrally through the cross head 16ª and has screw threaded engagement. Upon the forward end of the shift rod is a jam nut 65 that is adapted to bear against the cross head around the shift rod to hold said rod from accidental movement. The shift rod is loosely mounted in a post 66 surmounting the base of the machine and it is adapted to be moved longitudinally by an operating lever 67 to impart forward and backward movement to the cross head. Upon the shift rod in front of and back of the post 66 are adjustable stop collars 68 by which the degree of forward or backward movement of the shift rod and the cross head may be controlled. The shift rod is adapted to be rotated in either direction for the purpose of so altering the position of the cross head relative to the cutter of the machine as to space the gage bar of said cross head to a greater or less degree from the cutter in order that plates of glass of various dimensions may be cut in the use of the machine. The altering of the position of the cross head just referred to is provided for due to the screw threaded engagement between the cross head and the shift rod.

I claim:

1. In a glass cutting machine, a runway support, a pivotally mounted cutter holder, a cutter in said holder, a nut in the free end of said holder, an adjusting screw operable in said nut, a stationary member in which said adjusting screw is operable, and a spring interposed between said cutter and stationary member.

2. In a glass cutting machine, a runway, a cutter holder, a cutter supported by said holder, a pressure roller above said cutter, a spindle by which said roller is carried, a support to which said spindle is pivoted, a limitation screw in said spindle support beneath the spindle, an adjusting screw in said spindle support above the spindle, and a spring associated with said adjusting screw and bearing upon said spindle.

3. In a glass cutting machine, runway rails for the support of a sheet of glass, means for cutting the glass, an adjustable gage bar arranged parallel with said rails whereby the sheet of glass may be moved transversely of said rails, and an adjustably supported guide roller opposing said gage bar.

4. In a glass cutting machine, runway rails for the support of a sheet of glass, means for cutting the glass, a gage bar arranged parallel with said runway rails, an adjusting rod provided with a series of pin holes, a sleeve associated with said gage bar and operable upon said adjusting rod, and a set pin mounted in said sleeve and adapted to enter either of the pin holes in said adjusting rod.

5. In a glass cutting machine, a pair of cutters, one of which is arranged at an angle to the other, and stationary means upon which a sheet of glass may be conducted to be cut first by one of said cutters and thereafter by the other cutter and at an angle to the first cut, substantially as set forth.

6. In a glass cutting machine, a pair of stationary runway supports for a sheet of glass arranged at angles to each other, a cutter associated with each of said supports and located at angles to each other, and means for gaging the position of a sheet of of glass while it is traversing said cutters, substantially as set forth.

7. In a glass cutting machine, a pair of stationary runway supports for a sheet of glass arranged at angles to each other, a cutter associated with each of said supports and located at angles to each other, and means for gaging the position of a sheet of glass while it is traversing said cutters; said means comprising gage bars shiftable relative to said pair of supports, substantially as set forth.

8. In a glass cutting machine, a pair of stationary runway supports for a sheet of glass arranged at angles to each other, a cutter associated with each of said supports and located at angles to each other, and means for gaging the position of a sheet of glass while it is traversing said cutters; said means comprising shiftable gage bars and guiding members between which the sheets of glass are adapted to pass while traversing said cutters; substantially as set forth.

ARNOLD L. MILENTZ.

In the presence of—
 HOWARD G. COOK,
 EDNA B. LINN.